United States Patent [19]

Lew

[11] Patent Number: 5,295,398

[45] Date of Patent: Mar. 22, 1994

[54] METHOD FOR MEASURING CONVECTIVE INERTIA FORCE

[76] Inventor: Hyok S. Lew, 7890 Oak St., Arvada, Colo. 80005

[21] Appl. No.: 643,420

[22] Filed: Jan. 22, 1991

[51] Int. Cl.$^5$ .............................................. G01F 1/84
[52] U.S. Cl. ................................................ 73/861.38
[58] Field of Search ........................ 73/861.37, 861.38

[56] References Cited

U.S. PATENT DOCUMENTS

| | | | |
|---|---|---|---|
| 4,622,858 | 11/1986 | Mizerak | 73/861.38 |
| 4,703,660 | 11/1987 | Brenneman | 73/861.38 |
| 4,711,132 | 12/1987 | Dahlin | 73/861.38 |
| 4,759,223 | 7/1988 | Frost | 73/861.38 |
| 4,831,885 | 5/1989 | Dahlin | 73/861.38 |
| 5,050,439 | 9/1991 | Thompson | 73/861.38 |

Primary Examiner—Herbert Goldstein

[57] ABSTRACT

The convective inertia force of media moving through a laterally vibrating conduit with two extremities restrained from lateral displacement is measured as a measure of the mass flow rate of media moving through the conduit by a method; wherein the flexural vibration of the conduit is measured at the midsection and another section intermediate the midsection and one of the two extremities of the conduit, and the convective inertia force is determined as a function of ratio between two values of the flexural vibration of the conduit at said another section of the conduit respectively measured at two instants when absolute value of the flexural vibration at the midsection of the conduit reaches respectively the maximum and minimum values during at least one cycle of the flexural vibration of the conduit, or as a function of phase angle difference in the flexural vibration of the conduit between the midsection and said another section of the conduit.

4 Claims, 3 Drawing Sheets

METHOD FOR MEASURING CONVECTIVE INERTIA FORCE

BACKGROUND OF THE INVENTION

Without any exception, all of the existing mass flowmeters known as the Coriolis force flowmeters employ a pair of vibrating conduits, which are vibrated relative to one another in a flexural mode by an electromagnetic vibrator disposed at the midsection of the combination of the pair of conduits intermediate the two fixed extremities thereof (see the embodiments shown in FIGS. 9 through 13), wherein the electromagnetic vibrator produces a primary flexural vibration of the conduits in a symmetric mode about the midsections of the conduits. The inertia force of the fluid moving through the conduits produces a secondary flexural vibration of an antisymmetric mode about the midsection of the conduits as a result of dynamic reaction to the primary flexural vibration. The level of the antisymmetric secondary flexural vibration measured relative to the level of the symmetric primary flexural vibration is proportional to the amount of mass flow rate of fluid moving through the conduit. One of the most popular methods of measuring the relative level of the antisymmetric secondary flexural vibration as a measure of the mass flow rate of the fluid is to measure the phase angle difference between two vibratory motions respectively detected by a pair of motion detectors measuring the total flexural vibratory motions (sum of the symmetric primary and antisymmetric secondary vibrations) at two sections of the combinations of the conduits disposed symmetrically about the midsections of the combination of the pair of conduits.

Hyok S. Lew has invented a number of new mass flowmeters known as the convective inertia force flowmeters (see the embodiments shown in FIGS. 1 through 6), which employs a single conduit wherein the two opposite halves of the conduit are vibrated relative to one another in a flexural mode, which are in contrast to the pair of conduits employed in the existing Coriolis force flowmeter wherein both halves of each of the pair of conduits is vibrated in unison. The primary flexural vibration of the single conduit employed in the inventions by Lew is antisymmetric about the midsection thereof, and the secondary flexural vibration thereof is symmetric about the midsection of the single conduit, which contrast the symmetric primary and antisymmetric secondary flexural vibration of the pair of conduits employed in the existing Coriolis force flowmeter (compare FIGS. 7 and 8). Because of the above-mentioned difference in the mode of flexural vibration of the conduit, a new method of measuring the relative level of the symmetric secondary flexural vibration as a measure of the mass flow rate is in order, which method is specifically designed for the convective inertia force flowmeters invented by Lew and has a certain advantage over the conventional method involving the measurement of the phase angle difference.

BRIEF SUMMARY OF THE INVENTION

The primary object of the present invention is to provide a method for determining the relative level of the symmetric secondary flexural vibration produced by the antisymmetric primary flexural vibration of a conduit employed in a convective inertia force mass flowmeter as a measure of the mass flow rate of media moving through the conduit, which relative level is measured with respect to the level of the antisymmetric primary flexural vibration.

Another object is to provide the method set forth in the above-presented primary object of the present invention, wherein the relative level of the symmetric secondary flexural vibration of the conduit is determined from the phase angle difference in the flexural vibration (sum of the antisymmetric primary and symmetric secondary flexural vibrations) between two flexural vibrations respectively measured at the midsection of the conduit and a cross section of the conduit intermediate the midsection and one of the two anchored extremities of the conduit.

A further object is to provide the method set forth in the primary object, wherein the relative level of the symmetric secondary flexural vibration of the conduit is determined from a ratio between two values of the flexural vibration velocity measured at a cross section of the conduit intermediate the midsection of the conduit and one of the two anchored extremities thereof, which two values are respectively measured at two instants when the flexural vibration velocity measured at the midsection of the conduit are respectively equal to peak value and zero in a given cycle of the vibration.

Yet another object is to provide the method set forth in the primary object, wherein the relative level of the symmetric secondary flexural vibration of the conduit is determined from a ratio between an additional combination of two flexural vibration velocities respectively measured at two different cross sections of the conduit located symmetrically about the midsection of the conduit at an instant when the flexural vibration velocity at the midsection hits peak value, and a differential combination of the same two flexural vibration velocities measured at another instant when the flexural vibration velocity at the midsection vanishes.

Yet a further object is to provide the method set forth in the primary object, wherein the relative level of the symmetric secondary flexural vibration is determined from the phase angle difference in the flexural vibration between two flexural vibrations respectively measured at two cross sections of the conduit located symmetrically about the midsection.

Still another object is to provide a method for determining the relative level of the antisymmetric secondary flexural vibration produced by the symmetric primary flexural vibration of a conduit employed in a Coriolis force flowmeter as a measure of the mass flow rate of media moving through the conduit, which relative level is measured with respect to the level of the symmetric primary flexural vibration.

Still a further object is to provide the method set forth in the above-presented still another object of the present invention, wherein the relative level of the antisymmetric secondary flexural vibration of the conduit is determined from a ratio between two values of the flexural vibration velocity measured at a cross section of the conduit intermediate the midsection of the conduit and one of the two anchored extremities thereof, which two values are respectively measured at two instants when the flexural vibration velocity measured at the midsection of the conduit are respectively equal to zero and the peak value in a given cycle of the vibration.

Yet still another object is to provide the method set forth in the still another object of the present invention, wherein the relative level of the antisymmetric secondary flexural vibration of the conduit is determined from a ratio between a differential combination of two flexural vibration velocities respectively measured at two different cross sections of the conduit located symmetrically about the midsection of the conduit at an instant when the flexural vibration velocity at the midsection vanishes, and an additional combination of the same two flexural vibration velocities measured at another instant when the flexural vibration at the midsection hits a peak value.

Yet still a further object is to provide the method set forth in the still another object of the present invention, wherein the relative level of the antisymmetric secondary flexural vibration of the conduit is determined from the phase angle difference in the flexural vibration between two flexural vibrations respectively measured at the midsection of the conduit and at a cross section of the conduit intermediate the midsection and one of the two anchored extremities of the conduit.

These and other objects of the present invention will become clear as the description of the present invention progresses.

BRIEF DESCRIPTION OF THE FIGURES

The present invention may be described with a greater clarity and specificity by referring to the following figures.

DESCRIPTION OF THE ILLUSTRATED EMBODIMENTS

Figure 1:
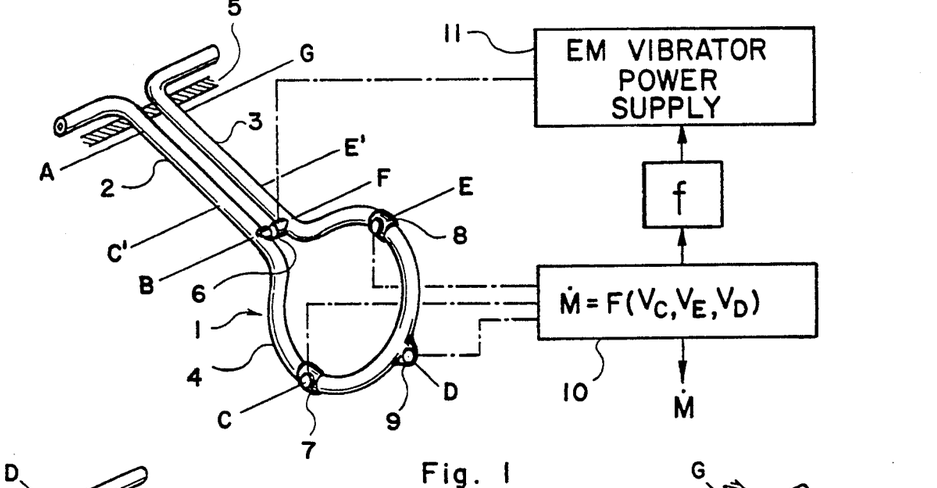
FIG. 1 illustrated a perspective view of an embodiment of the convective inertia force flowmeter including a single conduit under an antisymmetric primary flexural vibration.
Figure 2:
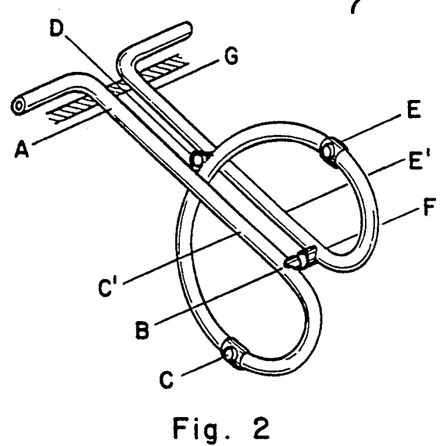
FIG. 2 illustrates another embodiment of the convective inertia force including a single conduit under an antisymmetric primary flexural vibration.
Figure 3:
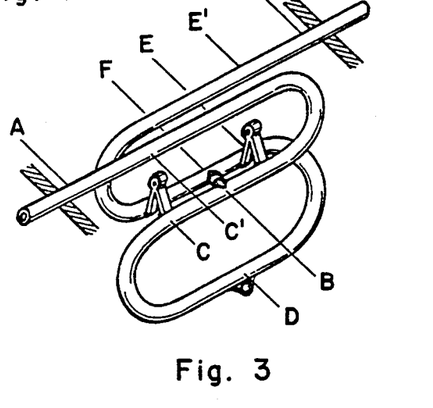
FIG. 3 illustrates a further embodiment of the convective inertia force flowmeter comprising a single conduit under an antisymmetric primary flexural vibration.
Figure 4:
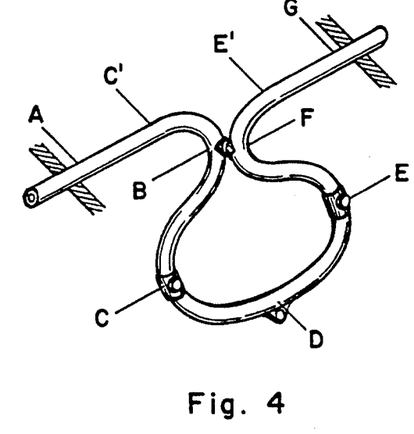
FIG. 4 illustrates yet another embodiment of the convective inertia force flowmeter including a single conduit under an antisymmetric primary flexural vibration.
Figure 5:
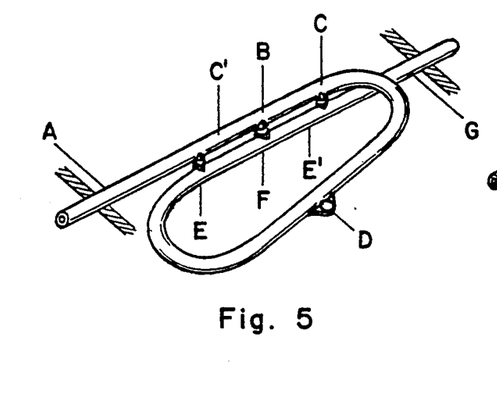
FIG. 5 illustrates yet a further embodiment of the convective inertia force flowmeter comprising a single conduit under an antisymmetric primary flexural vibration.
Figure 6:
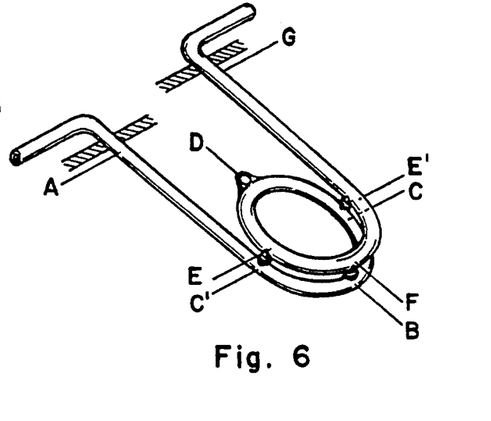
FIG. 6 illustrates still another embodiment of the convective inertia force flowmeter employing a single conduit under an antisymmetric primary flexural vibration.

In FIG. 1 there is illustrated a perspective view of an embodiment of the convective inertia force flowmeter invented by Hyok S. Lew, which comprises a single conduit 1 with two generally straight and parallel end sections 2 and 3 connected to one another by a looped midsection 4 substantially disposed on a plane generally perpendicular to the plane including the two generally straight end sections 2 and 3. The two extremities A and G of the conduit 1 are secured to a supporting structure 5. An electromagnetic vibrator 6 disposed at the overhanging extremities of the two end sections 2 and 3 vibrates the two opposite halves of the conduit 1 located on the two opposite sides of the midsection D relative to one another. The motion detectors 7 and 8 measure the flexural vibration of the conduit respectively at the two cross sections C and E symmetrically located about the midsection D of the conduit, while the motion detector 9 measures the flexural vibration of the conduit at the midsection D. In an alternative design, the two motion detectors 7 and 8 may be relocated respectively to C' and E' from the current position C and E. It should be noticed that the cross sections C and E are located respectively in the two opposite halves of the conduit intermediate the midsection D and the vibrated sections B-F, while the cross sections C' and E' are located respectively intermediate the vibrated sections B-F and the two anchored extremities A and G of the conduit. A data processor 10 processes data supplied by two or all three of the motion detectors 7, 8 and 9 and determines the mass flow rate M of media moving through the conduit 1 as a function of two or all three flexural vibration velocities supplied by the motion detectors 7, 8 and 9, which data processor 10 may also determine the natural frequency f of the flexural vibration of the conduit 1 and feed it into the electromagnetic vibrator power supply 11, whereby it emergizes the electromagnetic vibrator 6 with an alternating electric current oscillating at the natural frequency f of the flexural vibration of the conduit 1 and vibrates the conduit 1 at the natural frequency thereof. It should be understood that the electromagnetic vibrator 6 may be energized continuously with the ac current of the natural frequency f, that continuously generates flexural vibration of the conduit 1 at its natural frequency f, or the electromagnetic vibrator 6 may be energized with a pulse of current intermittently that produces resonant flexural vibration of the conduit 1 automatically at its natural frequency f.

In FIGS. 2, 3, 4, 5 and 6, there are illustrated other embodiments of the convective inertia force flowmeter invented by Hyok S. Lew operating on the same principles as those of the embodiment shown in FIG. 1, wherein A and G stand for the extremities of the conduit anchored to the support structure; B–F represents the section including the electromagnetic vibrator; C and E are the sections located symmetrically about the midsection D of the conduit and respectively including the two motion detectors measuring the flexural vibration velocities of the two opposite halves of the conduit, respectively; and the midsection D includes a motion detector measuring the flexural vibration velocity of the conduit at the midsection thereof. The sections C' and E' respectively represent two cross sections whereto the two motion detectors respectively located at the two sections C and E may be relocated in a modified embodiment. It should be understood that the embodiments shown in FIGS. 1 through 6 can be modified to other equivalents thereof as suggested by the relationship between the embodiments shown in FIGS. 1 and 4 or FIGS. 5 and 6, each of which pair of the embodiments illustrates an example of one embodiment modified to another.

Figure 7:
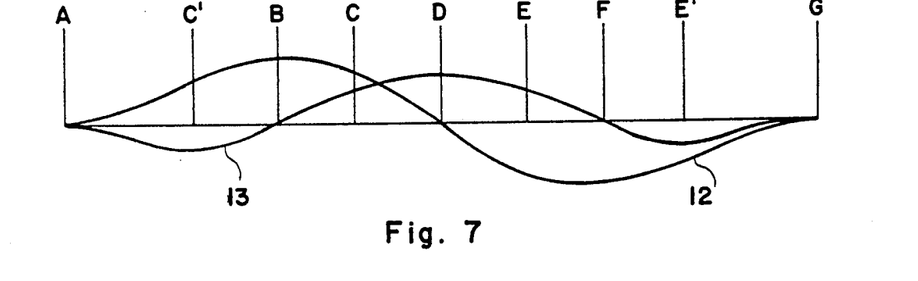
FIG. 7 illustrates the distributions of the antisymmetric primary flexural vibration and symmetric secondary flexural vibration produced by the media moving through the conduit as a reaction to the antisymmetric primary flexural vibration, which distributions take place in the convective inertia force flowmeters shown in FIGS. 1 through 6.

In FIG. 7 there is illustrated the distribution of the flexural vibration of the conduit included in the convective inertia force flowmeters shown in FIGS. 1 through 6 and their modifications and equivalents, which distribution is plotted following the length of the conduit now represented by a straight line with the two extremities A and G, wherein designations of other sections stand for the same symbolisms as those described in conjunction with FIGS. 1 through 6. The flexural vibration of the conduit comprises two components, which are the primary flexural vibration 12 generated by the electromagnetic vibrator located at the combination of sections B and F, which primary flexural vibration is antisymmetric about the midsection D, and the secondary flexural vibration 13 generated by the convective inertia force of the media moving through the conduit as a dynamic reaction to the symmetric primary flexural vibration 12, which secondary flexural vibration is symmetric about the midsection D. Of course, the antisymmetric primary flexural vibration as well as the symmetric secondary flexural vibration vanishes at the two extremities A and G of the conduit.

The equation of motion governing the flexural vibration of the conduit can be written in the form $$EI \frac{\partial^4 y}{\partial x^4} = \text{Loading on the conduit per unit length,} \quad (1)$$

and the boundary conditions for y is given by equation $$y = \frac{\partial y}{\partial t} = 0 \text{ at } x = \pm \frac{L}{2}, \quad (2)$$

where E is the elastic modulus of the material of the conduit, I is the moment of inertia of the cross sectional area of the conduit, x is the distance measured from the midsection D wherein x is positive between D and G, and negative between D and A, and y is the flexural deflection of the conduit measured from its undeflected position. The length of the conduit is equal to L that is the distance between A and G. The loading on the conduit per unit length thereof appearing on the right hand side of equation (1) includes the following forces:

$$\text{Inertia force of the conduit} = -m \frac{\partial^2 y}{\partial t^2}, \quad (3)$$

where m is the mass per unit length of the conduit and t is the time, and $$\text{Inertia force of the media contained in the conduit} = -A\rho \frac{\partial^2 y}{\partial t^2} - A\rho U \frac{\partial^2 y}{\partial x \partial t}, \quad (4)$$

where A is the cross sectional area of the flow passage in the conduit, $\rho$ is the density of the media and U is the convective velocity of the media moving through the flow passage in the conduit.

Substitution of equations (3) and (4) into equation (1) yields the equation $$EI \frac{\partial^4 y}{\partial x^4} + (m + A\rho) \frac{\partial^2 y}{\partial t^2} = -M \frac{\partial^2 y}{\partial x \partial t}, \quad (5)$$

where $M = A\rho U$ is the mass flow rate of the media through the flow passage in the conduit. The general solution of equation (5) can be expanded into a series of the following form:

$$y = y_1 + \left(\frac{M}{EI}\right) y_2 + \left(\frac{M}{EI}\right)^2 y_3 + \cdots, \quad (6)$$

where $y_1$ is the primary flexural vibration of the conduit generated by the electromagnetic vibrator, and $y_2$, $y_3$, etc.—are the secondary, tertiary, etc.—flexural vibrations generated by the media moving through the flow passage in the conduit as a reaction to the primary flexural vibration $y_1$. Substitution of equation (6) into equation (5) yields the following equation for the secondary flexural vibration $y_2$ as a function of the primary flexural vibration $y_1$:

$$\frac{\partial^4 y_2}{\partial x^4} + \frac{m + A\rho}{EI} \frac{\partial^2 y_2}{\partial t^2} = -\frac{\partial^2 y_1}{\partial x \partial t}. \quad (7)$$

For the sake of simplicity of analysis, a conduit simply supported at both extremities instead of a fixedly supported conduit will be investigated. The simplest form of $y_1$ satisfying the boundary conditions (2) is $$y_1 = y_0 \sin \frac{2\pi}{L} x \sin \omega t, \quad (8)$$

where $y_0$ is the amplitude of the primary flexural vibration and $\omega$ is the circular frequency of the natural vibration of the conduit. When equation (7) is solved for $y_2$ after substituting equation (8) thereinto, $y_2$ satisfying the boundary conditions (2) is found in the following form:

$$y_2 = \quad (9)$$

-continued $$y_0 \frac{\frac{2\pi\omega}{L}}{\frac{m+A\rho}{EI}\omega^2 - \left(\frac{2\pi}{L}\right)^4} Z\left(\pm \frac{L}{2}\right)\cos\frac{2\pi}{L} x \cos\omega t, \quad (5)$$

where $Z(\pm L/2)$ is a function that vanishes at $x = \pm L/2$ and increases to unity as values of x start to deviating from $\pm L/2$. As the specific form of the function $Z(\pm L/2)$ is irrelevant to the final conclusion leading to the present invention, solution for $Z(\pm L/2)$ will not be addressed. The natural circular frequency $\omega$ of the flexural vibration of the conduit is of the form $$\omega^2 = K^2 \frac{EI}{m + A\rho}, \quad (10)$$

where K is a constant of proportionality. When use of equations (8), (9) and (10) is made, equation (6) provides the following solution for the primary and secondary flexural vibration, which is sufficient for all practical purposes as the tertiary and other higher order solutions are negligibly small in most cases involving the convective inertia force flowmeters:

$$y = y_0 \left\{ \sin\frac{2\pi}{L} x \sin\omega t + \right. \quad (11)$$

$$\left. \frac{2\pi\omega M}{LEI\left[K^2 - \left(\frac{2\pi}{L}\right)^4\right]} Z\left(\pm \frac{L}{2}\right)\cos\frac{2\pi}{L} x \cos\omega t \right\}.$$

The first term on the right hand side of equation (11) is the antisymmetric primary flexural vibration having a distribution given by the curve 12 shown in FIG. 7, while the second term is the symmetric secondary flexural vibration having a distribution given by the curve 13 shown in FIG. 7. The flexural vibration velocity v is obtained by taking the time derivative of equation (11)

$$v = \omega y_0 \left\{ \sin\frac{2\pi}{L} x \cos\omega t - \right. \quad (12)$$

$$\left. \frac{2\pi\omega M}{LEI\left[K^2 - \left(\frac{2\pi}{L}\right)^4\right]} Z\left(\pm \frac{L}{2}\right)\cos\frac{2\pi}{L} x \sin\omega t \right\}.$$

The flexural vibration velocity at the sections C and E, and at the midsection D are given by equations $$v(\pm l) = \omega y_0 \left\{ \pm\sin\frac{2\pi l}{L}\cos\omega t - \right. \quad (13)$$

$$\left. \frac{2\pi\omega M}{LEI\left[K^2 - \left(\frac{2\pi}{L}\right)^4\right]} \cos\frac{2\pi l}{L}\sin\omega t \right\},$$

where $\pm l$ are the values of the x-coordinate at the sections C and E; and $$v(0) = -\omega y_0 \frac{2\pi\omega M}{LEI\left[K^2 - \left(\frac{2\pi}{L}\right)^4\right]} \sin\omega t. \quad (14)$$

Now, equations (13) and (14) provides four different methods for determining the amss flow rate M as a function of measured values of the flexural Vibration $v(\pm l)$ and/or $v(0)$ independent of the amplitude $y_0$ of the primary flexural vibration generated by the electromagnetic vibrator. Equation (13) can be written in the form $$v(\pm l) = -\omega y_0 \cos\frac{2\pi l}{L} \sin\left[\omega t \pm \left(\frac{\pi}{2} + \phi\right)\right], \quad (15)$$

where the net phase angle $\phi$ satisfies the equation $$M = \frac{LEI\left[K^2 - \left(\frac{2\pi}{L}\right)^4\right]}{2\pi\omega}\tan\frac{2\pi l}{L}\tan\phi. \quad (16)$$

When equations (14) and (15) are compared to one another, the phase angle $(\pi/2 + \phi)$ is the phase angle difference in the flexural vibration between the sections C and D or sections D and E, which is equal to one half of the phase angle difference in the flexural vibration between the sections C and E. The equation (16) provides the first method for determining the mass flow rate as the equation (16) can be written in the form $$M = H\tan\phi(0,\pm l), \quad (17)$$

where H is a constant of proportionality determined empirically by calibrating the flowmeter, that is independent of the flow variables such as fluid velocity and fluid density, and $\phi(0,\pm l)$ is the net phase angle difference in the flexural vibration between the two sections C and D or D and E. In other words, when the phase angle difference between the flexural vibratory motions at the two sections C and D or D and E is measured, the mass flow rate is determined by equation (17) or an empirical relationship equivalent thereto. The equation (17) can also be written in the form $$M = H\tan\frac{\phi(-l, +l)}{2}. \quad (18)$$

where $\phi(-l, +l)$ is the net phase angle difference between the flexural vibratory motions at the two sections C and E. The second method for determining the mass flow rate is to measure the phase angle difference between the flexural vibrations at the two sections C and E and determine the mass flow rate therefrom by equation (18) or an empirical equivalent thereof. The phase angle difference appearing in equation (17) or (18) are not dependent on the amplitude of the electrical signal representing the flexural vibration velocity and, consequently, the mass flow rate determined by equations (17) or (18), or the empirical equivalents thereof is not effected at all by a drift in the amplification factor of the motion transducer. From equations (13) and (14), the following relationships are obtained:

$$V(\pm l) = \pm \omega y_0 \sin \frac{2\pi l}{L}, \text{ when } v(0) = 0, \quad (19)$$

and $$V(\pm l) = -\omega y_0 \frac{2\pi \omega M}{LEI\left[K^2 - \left(\frac{2\pi}{L}\right)^4\right]} \cos \frac{2\pi l}{L}, \quad (20)$$

When v(0) reaches its peak value.

Hence, the following relationship results $$M = \frac{LEI\left[K^2 - \left(\frac{2\pi}{L}\right)^4\right]}{2\pi \omega} \tan \frac{2\pi l}{L} \frac{v(\pm l)|_{v(0)=PEAK}}{v(\pm l)|_{v(0)=0}}, \quad (21)$$

or $$M = H \frac{E(\pm l)|_{v(0)=PEAK}}{E(\pm l)|_{v(0)=0}}, \quad (22)$$

where $E(\pm l)$ is the amplitude of electrical signal generated by the motion sensor measuring $v(\pm l)$. The equation (22) provides the third method for determining the mass flow rate. In other words, the mass flow rate is determined from the ratio of the flexural vibration velocities at section C or E respectively measured at instants when the flexural vibration velocity at the midsection D hits the peak value and zero in each cycle of the flexural vibration, wherein equation (22) or an empirical equivalent thereof provides the necessary mathematical relationship. Since the mass flow rate is determined as a function of the amplitude ratio measured by the same motion transducer per equation (22) or an empirical equivalent thereof, a drift in the amplification factor of the motion transducer does not introduce any error. The equation (13) yields the following equations:

$$v(-l) + v(+l) = \quad (23)$$

$$-\omega y_0 \frac{4\pi \omega M}{LEI\left[K^2 - \left(\frac{2\pi}{L}\right)^4\right]} \cos \frac{2\pi l}{L} \sin \omega t.$$

and $$v(-l) - v(+l) = \omega y_0 \cdot 2\sin \frac{2\pi l}{L} \cos \omega t. \quad (24)$$

It follows from equations (23) and (24) that $$M = H \frac{v(-l)|_{v(0)=PEAK} + v(+l)|_{v(0)=PEAK}}{v(-l)|_{v(0)=0} - v(+l)|_{v(0)=0}}. \quad (25)$$

The transducer measuring the flexural vibration velocity generates an electrical signal with amplitude proportional to the flexural vibration velocity $$E(\pm l) = \lambda(\pm l) v(\pm l), \quad (26)$$

where $\lambda(\pm l)$ is the amplification factor of the motion transducer respectively disposed at the two cross sections C and E, wherein $\lambda(\pm l)$ and $\lambda(-l)$ have different values in general due to drift in the transducer performance and in the electronics conditioning the electrical signal generated by the transducer. When equation (26) is substituted into equation (25), the following equation is obtained:

$$M = H \frac{E(-l)|_{v(0)=PEAK} + \eta E(+l)|_{v(0)=PEAK}}{E(-l)|_{v(0)=0} - \eta E(+l)|_{v(0)=0}}, \quad (27)$$

where $$\eta = \frac{\lambda(-l)}{\lambda(+l)}.$$

The numerical value of $\eta$ is actually determined by the following equation $$\eta = \frac{E(-l)}{E(+l)} \cdot \frac{v(+l)}{v(-l)} = \frac{-E(-l)}{E(+l)}\bigg|_{v(0)=0}. \quad (28)$$

which follows from equation (24) that shows $v(-l) = -V(+l)$ when $\sin \omega t = 0$ or $v(0) = 0$. The equation (27) with value of $\eta$ given by equation (28) provides the fourth method for determining the mass flow rate. The mass flow rate determined by equation (27) or an empirical equivalent does not suffer from any error due to a drift in the amplication factor of the motion transducer measuring the flexural vibration velocities. The four different methods for measuring the mass flow rate described in the preceding paragraphs may be employed individually, or in a paired or multiple combination. For example, the first method defined by equation (17) and the third method defined by equation (22) may be employed in parallel as the two methods use the same pair of the motion sensors respectively disposed at the two cross sections C and D, or D and E, wherein the two values of the mass flow rate respectively determined by the two different methods can be checked against one another as a measure of proper operation of the flowmeter. The third method defined by equation (22) may be simultaneously implemented with two motion sensors respectively disposed at the two sections C and E with the motion detector disposed at the midsection D providing the common triggering, wherein the final value of the mass flow rate can be obtained by averaging the two values respectively obtained from the electrical signals generated by the two motion sensors located at the two sections C and E, respectively, which two values can also be checked against one another as a measure of proper operation of the flowmeter. It should be understood that the four different methods for determining the mass flow rate derived and described herein remains valid when the motion sensors are relocated from the sections C and E to the sections C' and E'. It should be further understood that the phase angle difference between two flexural vibration velocities, that determines the mass flow rate, can be taken between a pair of motion sensors respectively located at the two cross sections C and C' or E and E' instead of C and E or C' and E'.

Figure 8:
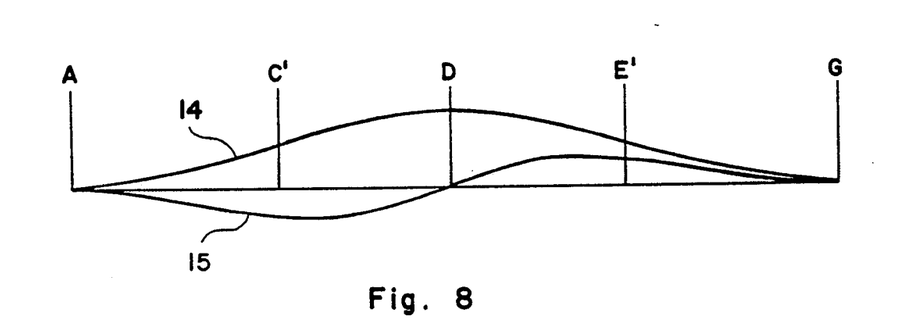
FIG. 8 illustrates the distributions of the symmetric primary flexural vibration and antisymmetric secondary flexural vibration taking place in the Coriolis force flowmeters shown in FIGS. 9 through 13.

In FIG. 8 there is illustrated the distributions of the symmetric primary flexural vibration 14 and the antisymmetric secondary flexural vibration 15, which mode of flexural vibration takes place with one of the pair of conduits employed in the existing Coriolis force flowmeters such as those shown in FIGS. 9 through 13, wherein the pair of conduits are vibrated relative to one another by an electromagnetic vibrator disposed at the midsection of the combination of the pair of the conduits.

Figures 9, 10, 11, 12, 13:
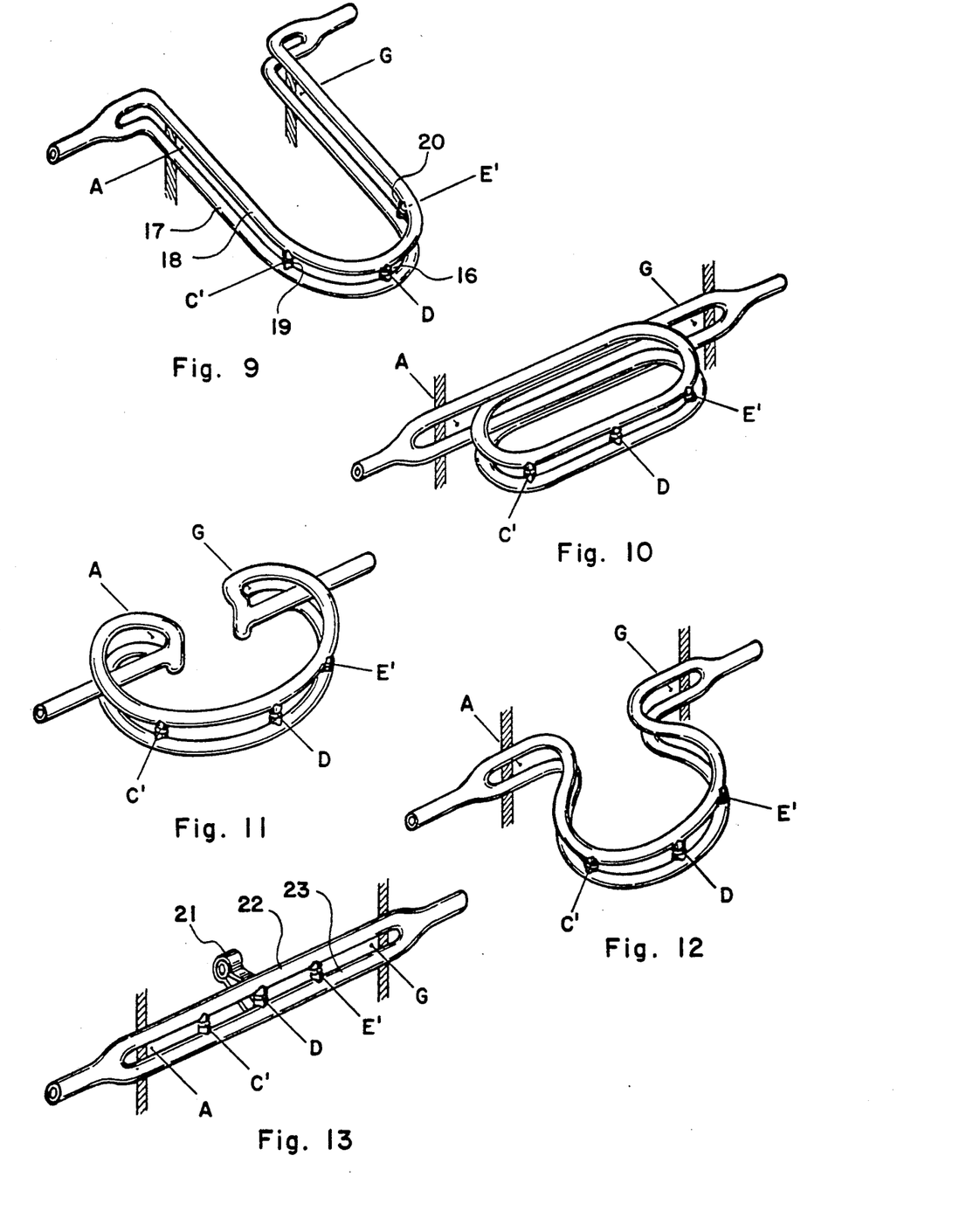
FIG. 9 illustrates an embodiment of the Coriolis force flowmeter employing a pair of conduits vibrated relative to one another in a mode of symmetric primary flexural vibration.
FIG. 10 illustrates another embodiment of the Coriolis force flowmeter comprising a pair of conduits vibrated relative to one another in a mode of symmetric primary flexural vibration.
FIG. 11 illustrates a further embodiment of the Coriolis force flowmeter including a pair of conduits vibrated relative to one another in a mode of symmetric primary flexural vibration.
FIG. 12 illustrates yet another embodiment of the Coriolis force flowmeter employing a pair of conduits vibrated relative to one another in a mode of symmetric primary flexural vibration.
FIG. 13 illustrates yet a further embodiment of the Coriolis force flowmeter comprising a pair of straight conduits as shown or a pair of S-shaped conduits in a modified design not shown here, wherein the pair of conduits are vibrated relative to one another in a mode of symmetric primary flexural vibration.

In FIGS. 9, 10, 11, 12 and 13, there are illustrated different versions of the existing Coriolis force flowmeters. It is rather obvious that the embodiments shown in FIGS. 10, 11 and 12 are design variations of the embodiment shown in FIG. 9, while the embodiment shown in FIG. 13 is an independent species of the invention unrelated to those embodiments shown in FIGS. 9 through 12. The pair of straight conduits included in the embodiment shown in FIG. 13 may be replaced with a pair of S-shaped conduits disposed parallel to one another. In these versions of the existing Coriolis force flowmeters, an electromagnetic vibrator 16 disposed at the midsection D vibrates the two parallel conduits 17 and 18 relative to one another and thus generates the primary flexural vibration symmetric about the midsection D as depicted by the curve 14 shown in FIG. 8 in contrast to the antisymmetric primary flexural vibration taking place in the convective inertia force flowmeters shown in FIGS. 1 through 6. The secondary flexural vibration generated by the media moving through the conduits as a dynamic reaction to the symmetric primary flexural vibration has an antisymmetric distribution depicted by the curve 15 shown in FIG. 8, which is in contrast to the symmetric secondary flexural vibration occuring in the convective inertia force flowmeters shown in FIGS. 1 through 6. Without any exceptions, these existing Coriolis force flowmeters employ a pair of motion sensors 19 and 20 respectively disposed at the two sections C' and E' located symmetrically about the midsection D and none of them has a motion sensor disposed at the midsection D. As a consequence, these existing Coriolis force flowmeters are impossible to operate on the principles similar to those set forth by equations (17), (22) or (27), and operate only on principles defined by equation (18). Of course, there exists a serious technical problem to include a motion sensor at the midsection D where the electromagnetic vibrator is located. As shown by the embodiment illustrated in FIG. 13, a motion sensor 21 operating on nonmagnetic principles such as a circular cylindrical shell piezo electric element confined within a cylindrical cavity that opens and closes with the relative flexural vibrating motion of the two straight conduits 22 and 33 can be installed at the midsection D, which modification is also compatible with other Coriolis force flowmeters shown in FIGS. 9, 10, 11 and 12. Once this modification is incorporated, the Coriolis force flowmeters shown in FIGS. 1 through 13 and their equivalents can determine the mass flow rate by the principles set forth by equation (17), (22) or (27), which principles are different from the method presently employed thereby that is defined by equation (18). Because of the reversal of the symmetry and antisymmetry in the mode of the flexural vibration of the conduit, the equation defining the four different methods of measuring the mass flow rate undergo certain modifications. The first method for measuring the mass flow rate employing the two motion sensors disposed at the two sections C' and D or D and E' and set forth by equation (17) remains the same as equation (16) leading to equation (17) remains valid when the term tan $(2\pi l/L)$ in equation (16) is replaced with cot $(2\pi l/L)$.

Of course, the second method set forth by equation (18) is the method being practiced by these existing Coriolis force flowmeters at the present time. The equation (22) defining the third method changes to the following equation:

$$M = H \frac{E(\pm l)|_{\kappa(0)=0}}{E(\pm l)|_{\kappa(0)=PEAK}} . \tag{29}$$

The equation setting forth the fourth method takes the following form:

$$M = H \frac{E(-l)|_{\kappa(0)=0} - \eta E(+l)|_{\kappa(0)=0}}{E(-l)|_{\kappa(0)=PEAK} + \eta E(+l)|_{\kappa(0)=PEAK}} \tag{30}$$

where $$\eta = \frac{E(-l)}{E(+l)}\bigg|_{\kappa(0)=PEAK} .$$

The convective inertia force flowmeters shown in FIGS. 1 through 6 have the following advantages over the Coriolis force flowmeters shown in FIGS. 9 through 13: Firstly, the single conduit with the two opposite halves vibrated relative to one another provides a better capability of measuring lower mass flow rates as the undivided flow moving through the single conduit produces a greater amount of the convective inertia force compared with the divided flow bifurcated into the pair of tubes. Secondly, the midsection of the single conduit with the two halves vibrated relative to one another has its midsection completely free of any detrimental mass hanging thereonto that interferes with the natural flexural vibration and the measurement thereof. As a consequence, it provides a perfect place for a motion detector that provides the trigger signal most accurately and reliably. Thirdly, the anchored extremities of the conduit as well as the electromagnetic vibrator transmit the noise vibration to the conduit. The motion sensors included in the single conduit with the two halves vibrated relative to one another at sections intermediate the two sections B and F receiving the electromagnetic vibratory force are much more immune to the noise vibrations transmitted through the anchored extremities of the conduit compared with the motion sensors included in the existing Coriolis force flowmeter disposed intermediate the two noise transmitting sections, the anchored extremity and the midsection including the electromagnetic vibrator.

While the principles of the present invention have now become clear by the illustrative embodiments, there will be many modifications of the structures, arrangements, proportions, elements and materials, which are immediately obvious to those skilled in the art and particularly adapted to the specific working environments and operating conditions in the practice of the invention without departing from those principles. It is not desired to limit the invention to the particular illustrative embodiments shown and described and accordingly, all suitable modifications and equivalents may be regarded as falling within the scope of the invention as defined by the claims which follow.

The embodiments of the invention, in which an exclusive property or priviledge is claimed, are defined as follows:

1. A method for determining mass flow rate of media moving through a conduit with two extremities restrained from experiencing lateral displacement, comprising in combination:

a) generating a primary flexural vibration of the conduit in one of a symmetric and antisymmetric mode with respect to a midsection of the conduit by exerting a force laterally thereon, said primary flexural vibration of the conduit creating a secondary flexural vibration of the conduit out of phase relative to the primary flexural vibration of the conduit as a result of dynamic interaction between the primary flexural vibration of the conduit and motion of media moving through the conduit;

b) detecting resultant flexural vibration of the conduit at the midsection thereof by using a first motion sensor providing a first alternating electrical signal generated by the resultant flexural vibration of the conduit at the midsection thereof, and resultant flexural vibration of the conduit at another section thereof intermediate the midsection and one of the two extremities of the conduit by using a second motion sensor providing a second alternating electrical signal generating by the resultant flexural vibration of the conduit at said another section thereof;

c) taking a first numerical value of said second alternating electrical signal at an instant when numerical value of said first alternating electrical signal is equal to zero;

d) taking a second numerical value of said second alternating electrical signal at an instant when numerical value said first alternating electrical signal reaches a peak value; and e) determining mass flow rate of media moving through the conduit as a function of ratio between said first and second numerical values of the second alternating electrical signal.

2. A method as defined in claim 1 wherein said method comprises detecting resultant flexural vibration of the conduit at a further section thereof intermediate the midsection and the other of the two extremities of the conduit by using a third motion sensor providing a third alternating electrical signal generated by the flexural vibration of the conduit at said a further section thereof, and measuring first numerical value of said third alternating electrical signal at an instant when numerical value of said first alternating electrical signal is equal to zero and measuring second numerical value of said third alternating electrical signal at another instant when numerical valve of said first electrical signal reaches a peak value, and determining the mass flow rate of media as a function of ratio between said first and second numerical values of the third alternating electrical signal.

3. A method as defined in claim 2 wherein final value of the mass flow rate of media is obtained by taking an averaged value between the two mass flow rates respectively determined by said two methods.

4. A method as defined in claim 2 wherein the two mass flow rates respectively determined by said two methods are compared to one another for consistency as a measure of proper operation of the method.

* * * * *